(12) United States Patent
Murakami et al.

(10) Patent No.: US 10,354,784 B2
(45) Date of Patent: Jul. 16, 2019

(54) NON-ORIENTED MAGNETIC STEEL SHEET AND METHOD OF MANUFACTURING THE SAME

(71) Applicant: NIPPON STEEL & SUMITOMO METAL CORPORATION, Tokyo (JP)

(72) Inventors: Kenichi Murakami, Tokyo (JP); Yoshiaki Natori, Tokyo (JP); Takuya Matsumoto, Tokyo (JP); Hiroki Hori, Tokyo (JP); Takeaki Wakisaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 262 days.

(21) Appl. No.: 15/313,284

(22) PCT Filed: Jul. 2, 2015

(86) PCT No.: PCT/JP2015/069197
§ 371 (c)(1),
(2) Date: Nov. 22, 2016

(87) PCT Pub. No.: WO2016/002904
PCT Pub. Date: Jan. 7, 2016

(65) Prior Publication Data
US 2017/0194082 A1  Jul. 6, 2017

(30) Foreign Application Priority Data
Jul. 2, 2014 (JP) ................. 2014-136949

(51) Int. Cl.
| | |
|---|---|
| *C22C 38/02* | (2006.01) |
| *C22C 38/06* | (2006.01) |
| *C22C 38/08* | (2006.01) |
| *C22C 38/60* | (2006.01) |
| *C21D 8/12* | (2006.01) |
| *C21D 9/46* | (2006.01) |
| *H01F 1/047* | (2006.01) |
| *H01F 1/16* | (2006.01) |
| *H01F 1/147* | (2006.01) |
| *H01F 41/02* | (2006.01) |
| *H02K 1/02* | (2006.01) |
| *H01F 1/03* | (2006.01) |
| *C22C 38/00* | (2006.01) |
| *C22C 38/04* | (2006.01) |

(Continued)

(52) U.S. Cl.
CPC ............. *H01F 1/0306* (2013.01); *C21D 8/12* (2013.01); *C21D 8/1222* (2013.01); *C21D 8/1233* (2013.01); *C21D 8/1261* (2013.01); *C21D 9/46* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/50* (2013.01); *C22C 38/54* (2013.01); *C22C 38/60* (2013.01); *H01F 1/16* (2013.01); *H01F 41/0233* (2013.01); *H02K 1/02* (2013.01); *C21D 2211/004* (2013.01)

(58) Field of Classification Search
None
See application file for complete search history.

(56) References Cited

U.S. PATENT DOCUMENTS

| 5,676,771 A | 10/1997 | Yano et al. |
| 2011/0056592 A1 | 3/2011 | Arita et al. |

(Continued)

FOREIGN PATENT DOCUMENTS

| CN | 102007226 A | 4/2011 |
| CN | 102367547 A | 3/2012 |

(Continued)

OTHER PUBLICATIONS

English translation of International Preliminary Report on Patentability and Written Opinion dated Jan. 12, 2017, in PCT International Application No. PCT/JP2015/069197.
Office Action dated Apr. 26, 2018, in Chinese Patent Application No. 201580033694.1.
International Search Report for PCT/JP2015/069197 dated Oct. 6, 2015.
Written Opinion of the International Searching Authority for PCT/JP2015/069197 (PCT/ISA/237) dated Oct. 6, 2015.

(Continued)

Primary Examiner — Deborah Yee
(74) Attorney, Agent, or Firm — Birch, Stewart, Kolasch & Birch, LLP

(57) ABSTRACT

A non-oriented magnetic steel sheet includes a specific chemical composition represented by, in mass %: Si: 3.0% to 3.6%; Al: 0.50% to 1.25%; Mn: 0.5% to 1.5%; Sb or Sn or both of them: [Sb]+[Sn]/2 is 0.0025% to 0.05% where [Sb] denotes an Sb content and [Sn] denotes an Sn content; P: 0.010% to 0.150%; Ni: 0.010% to 0.200%; C: 0.0010% to 0.0040%; and others. The thickness of the non-oriented magnetic steel sheet is 0.15 mm to 0.30 mm. the non-oriented magnetic steel sheet includes magnetic properties represented by, where t denotes a thickness (mm) of the non-oriented magnetic steel sheet: a magnetic flux density B50: "0.2×t+1.52" T or more; a magnetic flux density difference ΔB50: 0.08 T or less; core loss W10/50: 0.95 W/kg or less; and core loss W10/400: "20×t+7.5" W/kg or less. A ratio of a number of intergranular carbides precipitated in grains relative to a sum of the number of the intergranular carbides and a number of grain boundary carbides precipitated on grain boundaries is 0.50 or less.

7 Claims, No Drawings

(51) Int. Cl.
*C22C 38/42* (2006.01)
*C22C 38/44* (2006.01)
*C22C 38/46* (2006.01)
*C22C 38/50* (2006.01)
*C22C 38/54* (2006.01)

(56) References Cited

U.S. PATENT DOCUMENTS

| | | | |
|---|---|---|---|
| 2011/0108307 A1 | 5/2011 | Arita et al. | |
| 2012/0298267 A1* | 11/2012 | Hu | C21D 8/1261 148/546 |
| 2014/0227127 A1* | 8/2014 | Natori | C21D 8/12 420/103 |
| 2014/0342150 A1 | 11/2014 | Wakisaka | |
| 2015/0136278 A1* | 5/2015 | Nakanishi | H01F 1/14775 148/111 |

FOREIGN PATENT DOCUMENTS

| | | |
|---|---|---|
| CN | 103842544 A | 6/2014 |
| EP | 2 278 034 A1 | 1/2011 |
| JP | 7-188752 A | 7/1995 |
| JP | 11-222653 A | 8/1999 |
| JP | 2003-213385 A | 7/2003 |
| JP | 2007-162096 A | 6/2007 |
| JP | 2008-127600 A | 6/2008 |
| JP | 2010-185119 A | 8/2010 |
| JP | 2012-36459 A | 2/2012 |
| JP | 2013-44010 A | 3/2013 |
| JP | 2013-91837 A | 5/2013 |
| JP | 2014-37581 A | 2/2014 |
| KR | 10-2010-0122116 A | 11/2010 |
| KR | 10-2014-0050743 A | 4/2014 |
| TW | 201012949 A1 | 4/2010 |
| TW | 201348464 A | 12/2013 |
| WO | WO 2013/146879 A1 | 10/2013 |
| WO | WO 2014/027452 A1 | 2/2014 |

OTHER PUBLICATIONS

Notification of Reason for Refusal dated Mar. 20, 2018, in Korean Patent Application No. 10-2016-7034487, with English translation.
Extended European Search Report dated Nov. 3, 2017, in European Patent Application No. 15814427.9.

* cited by examiner

NON-ORIENTED MAGNETIC STEEL SHEET AND METHOD OF MANUFACTURING THE SAME

TECHNICAL FIELD

The present invention relates to a non-oriented magnetic steel sheet, and a method of manufacturing the same.

BACKGROUND ART

Non-oriented magnetic steel sheets are used for various motors. For example, the non-oriented magnetic steel sheets are used for compressor motors of an air-conditioner and a refrigerator, and driving motors of an electric vehicle and a hybrid vehicle. The compressor motors of the air-conditioner and the refrigerator are mainly driven in an inverter mode, and therefore, reduction in core loss at a commercial frequency (50 Hz and 60 Hz) and reduction in core loss at a high frequency (100 Hz to 1000 Hz) are important to improve efficiency. A driving motor of an automobile changes a rotation speed in accordance with a traveling speed of the automobile. Besides, high motor torque is required when the automobile starts.

In consideration of the above, high magnetic flux density, low core loss at the commercial frequency, and low core loss at the high frequency (hereinafter, it is sometimes called a "high-frequency core loss") are demanded for the non-oriented magnetic steel sheet. Further, a motor core is roughly classified into an integral type and a separate type, and the integral-type motor core is mainly used, and therefore, isotropic magnetic properties are demanded. However, a conventional non-oriented magnetic steel sheet cannot satisfy these requirements.

CITATION LIST

Patent Literatures

Patent Literature 1: Japanese Laid-open Patent Publication No. 2010-185119
Patent Literature 2: Japanese Laid-open Patent Publication No. 2003-213385
Patent Literature 3: Japanese Laid-open Patent Publication No. 2013-91837
Patent Literature 4: Japanese Laid-open Patent Publication No. 2007-162096
Patent Literature 5: Japanese Laid-open Patent Publication No. H7-188752
Patent Literature 6: Japanese Laid-open Patent Publication No. 2013-44010

SUMMARY OF INVENTION

Technical Problem

An object of the present invention is to provide a non-oriented magnetic steel sheet capable of accomplishing high magnetic flux density, low core loss at a commercial frequency, low high-frequency core loss and isotropic magnetic properties, and a method of manufacturing the same.

Solution to Problem

The present inventors studied hard to solve the above-stated problems. As a result, it turned out that Sb or Sn, or both of them are contained for proper amounts, and P, Ni, and C are contained for proper amounts, a sheet thickness is small, and so on are important to accomplish the high magnetic flux density, the low core loss at the commercial frequency, and the low high-frequency core loss.

The present inventors came up to various modes of the invention described below by further hard studies based on the above-stated knowledges.

(1)
A non-oriented magnetic steel sheet, including:
a chemical composition represented by, in mass %:
Si: 3.0% to 3.6%;
Al: 0.50% to 1.25%;
Mn: 0.5% to 1.5%;
Sb or Sn or both of them: [Sb]+[Sn]/2 is 0.0025% to 0.05% where [Sb] denotes an Sb content and [Sn] denotes an Sn content;
P: 0.010% to 0.150%;
Ni: 0.010% to 0.200%;
C: 0.0010% to 0.0040%;
N: 0.0030% or less;
S: 0.0020% or less;
Ti: 0.0030% or less;
Cu: 0.0500% or less;
Cr: 0.0500% or less;
Mo: 0.0500% or less;
Bi: 0.0050% or less;
Pb: 0.0050% or less;
V: 0.0050% or less;
B: 0.0050% or less; and
balance: Fe and impurities, and
magnetic properties represented by, where t denotes a thickness (mm) of the non-oriented magnetic steel sheet:
a magnetic flux density B50: "0.2×t+1.52" T or more;
a magnetic flux density difference ΔB50: 0.08 T or less;
core loss W10/50: 0.95 W/kg or less; and
core loss W10/400: "20×t+7.5" W/kg or less,
wherein
the thickness is 0.15 mm to 0.30 mm, and
a ratio of a number of intergranular carbides precipitated in grains relative to a sum of the number of the intergranular carbides and a number of grain boundary carbides precipitated on grain boundaries is 0.50 or less.

(2)
The non-oriented magnetic steel sheet according to (1), wherein in the chemical composition,
P: 0.015% to 0.100%,
Ni: 0.020% to 0.100%, or
C: 0.0020% to 0.0030%, or
any combination thereof is satisfied.

(3)
A method of manufacturing a non-oriented magnetic steel sheet, including:
hot-rolling of a steel material to obtain a hot-rolled steel sheet;
cold-rolling of the hot-rolled steel sheet to obtain a cold-rolled steel sheet;
first annealing of the hot-rolled steel sheet before the cold-rolling is completed; and
second annealing of the cold-rolled steel sheet,
wherein the first annealing includes:
retaining the hot-rolled steel sheet in a first temperature range from 850° C. to 1100° C. for 10 seconds to 120 seconds, and
after the retaining, cooling the hot-rolled steel sheet at a rate of 5° C./s to 50° C./s in a temperature zone from 850° C. to 600° C., wherein the second annealing includes:
  retaining the cold-rolled steel sheet in a second temperature range from 900° C. to 1100° C. for 10 seconds to 240 seconds, and
  after the retaining, cooling the cold-rolled steel sheet at a rate of 10° C./s to 40° C./s in a temperature zone from 900° C. to 300° C., and
wherein the steel material includes a chemical composition represented by, in mass %,
  Si: 3.0% to 3.6%;
  Al: 0.50% to 1.25%;
  Mn: 0.5% to 1.5%;
  Sb or Sn or both of them: [Sb]+[Sn]/2 is 0.0025% to 0.05% where [Sb] denotes an Sb content and [Sn] denotes an Sn content;
  P: 0.010% to 0.150%;
  Ni: 0.010% to 0.200%;
  C: 0.0010% to 0.0040%;
  N: 0.0030% or less;
  S: 0.0020% or less;
  Ti: 0.0030% or less;
  Cu: 0.0500% or less;
  Cr: 0.0500% or less;
  Mo: 0.0500% or less;
  Bi: 0.0050% or less;
  Pb: 0.0050% or less;
  V: 0.0050% or less;
  B: 0.0050% or less; and
  balance: Fe and impurities.

(4)
The method of manufacturing the non-oriented magnetic steel sheet according to (3), wherein hot-rolled sheet annealing is performed as the first annealing before the cold-rolling.

(5)
The method of manufacturing the non-oriented magnetic steel sheet according to (3), further including hot-rolled sheet annealing before the cold-rolling, wherein an intermediate annealing is performed as the first annealing during the cold-rolling.

(6)
The method of manufacturing the non-oriented magnetic steel sheet according to any one of (3) to (5), wherein in the chemical composition,
  P: 0.015% to 0.100%,
  Ni: 0.020% to 0.100%, or
  C: 0.0020% to 0.0030%, or
  any combination thereof is satisfied.

(7)
The method of manufacturing the non-oriented magnetic steel sheet according to any one of (3) to (6), wherein a thickness of the cold-rolled steel sheet is 0.15 mm to 0.30 mm.

Advantageous Effects of Invention

According to the present invention, it is possible to obtain excellent magnetic properties because a chemical composition, a ratio of a number of intergranular carbides precipitated in grains relative to a sum of the number of the intergranular carbides and a number of grain boundary carbides precipitated on grain boundaries, and so on are appropriate.

DESCRIPTION OF EMBODIMENTS

Hereinafter, embodiments of the present invention are described.

First, a chemical composition of a non-oriented magnetic steel sheet according to an embodiment of the present invention and a steel material used for manufacturing the same is described. The non-oriented magnetic steel sheet according to the embodiment of the present invention is manufactured through hot-rolling of a steel material, hot-rolled sheet annealing, cold-rolling, finish annealing, and so on, though details will be described later. Accordingly, the chemical compositions of the non-oriented magnetic steel sheet and the steel material are appropriate for the above-stated processes in addition to properties of the non-oriented magnetic steel sheet. In the following description, a sign "%" being a unit of a content of each element contained in the non-oriented magnetic steel sheet or the steel material means "mass %" unless otherwise specified. The non-oriented magnetic steel sheet according to the embodiment includes a chemical composition represented by: Si: 3.0% to 3.6%; Al: 0.50% to 1.25%; Mn: 0.5% to 1.5%; Sb or Sn or both of them: [Sb]+[Sn]/2 is 0.0025% to 0.05% where [Sb] denotes an Sb content and [Sn] denotes an Sn content; P: 0.010% to 0.150%; Ni: 0.010% to 0.200%; C: 0.0010% to 0.0040%; N: 0.0030% or less; S: 0.0020% or less; Ti: 0.0030% or less; Cu: 0.0500% or less; Cr: 0.0500% or less; Mo: 0.0500% or less; Bi: 0.0050% or less; Pb: 0.0050% or less; V: 0.0050% or less; B: 0.0050% or less; and balance: Fe and impurities. As the impurities, ones contained in raw materials such as ore and scrap, and ones contained during a manufacturing process are exemplified.

(Si: 3.0% to 3.6%)
Si increases a specific resistance and reduces core loss. When a Si content is less than 3.0%, the core loss cannot be sufficiently reduced. Thus, the Si content is 3.0% or more, and preferably 3.2% or more. On the other hand, when the Si content is over 3.6%, toughness deteriorates and cold-rolling becomes difficult. Thus, the Si content is 3.6% or less.

(Al: 0.50% to 1.25%)
Al increases the specific resistance and reduces the core loss, particularly a high-frequency core loss. When an Al content is less than 0.50%, the high-frequency core loss cannot be sufficiently reduced. Thus, the Al content is 0.50% or more. On the other hand, when the Al content is over 1.25%, hysteresis loss increases, and core loss at a commercial frequency increases. Thus, the Al content is 1.25% or less.

(Mn: 0.5% to 1.5%)
Mn reduces the core loss. When a Mn content is less than 0.5%, the core loss cannot be sufficiently reduced. Fine precipitates are sometimes formed so as to increase the core loss. Thus, the Mn content is 0.5% or more, and preferably 0.7% or more. On the other hand, when the Mn content is over 1.5%, many Mn carbides are formed, and the core loss increases. Thus, the Mn content is 1.5% or less.

(Sb or Sn or Both of them: [Sb]+[Sn]/2 is 0.0025% to 0.05%)
Sb and Sn improve magnetic flux density. Sb are effective twice as much as Sn. When Sb]+[Sn]/2 is less than 0.0025% where [Sb] denotes an Sb content and [Sn] denotes an Sn content, sufficient magnetic flux density cannot be obtained. Thus, [Sb]+[Sn]/2 is 0.0025% or more. On the other hand, when [Sb]+[Sn]/2 is over 0.05%, an improvement effect of the magnetic flux density is saturated, and cost increases in vain. Thus, [Sb]+[Sn]/2 is 0.05% or less.

(P: 0.010% to 0.150%)
It was made clear by the present inventors that P contributes to improvement in the magnetic flux density. When a P content is less than 0.010%, the sufficient magnetic flux density cannot be obtained. Thus, the P content is 0.010% or more, and preferably 0.015% or more. On the other hand, when the P content is over 0.150%, the core loss increases. Thus, the P content is 0.150% or less, and preferably 0.100% or less.

(Ni: 0.010% to 0.200%)

It was made clear by the present inventors that Ni contributes to improvement in the magnetic flux density. When a Ni content is less than 0.010%, the sufficient magnetic flux density cannot be obtained. Thus, the Ni content is 0.010% or more, and preferably 0.020% or more. On the other hand, when the Ni content is over 0.200%, the core loss increases. Thus, the Ni content is 0.200% or less, and preferably 0.100% or less.

(C: 0.0010% to 0.0040%)

It was made clear by the present inventors that C contributes to improvement in the magnetic flux density. When a C content is less than 0.0010%, the sufficient magnetic flux density cannot be obtained. Thus, the C content is 0.0010% or more, and preferably 0.0020% or more. When the C content is over 0.0040% and the Mn content is 0.5% or more, many Mn carbides are formed, and the core loss increases. Thus, the C content is 0.0040% or less, and preferably 0.0030% or less.

(N: 0.0030% or Less)

N is not an essential element, and is contained as an impurity in the steel, for example. N causes magnetic aging so as to increase the core loss. Accordingly, the lower an N content is, the better. The increase in the core loss is remarkable when the N content is over 0.0030%. Thus, the N content is 0.0030% or less. It requires considerable cost to lower the N content to less than 0.0001%. Therefore, it is not necessary to lower the N content to less than 0.0001%.

(S: 0.0020% or Less)

S is not an essential element, and is contained as an impurity in the steel, for example. S forms fine precipitates so as to increase the core loss. Accordingly, the lower an S content is, the better. The increase in the core loss is remarkable when the S content is over 0.0020%. Thus, the S content is 0.0020% or less. It requires considerable cost to lower the S content to less than 0.0001%. Therefore, it is not necessary to lower the S content to less than 0.0001%.

(Ti: 0.0030% or Less)

Ti is not an essential element, and is contained as an impurity in the steel, for example. Ti forms fine precipitates so as to increase the core loss. Accordingly, the lower a Ti content is, the better. The increase in the core loss is remarkable when the Ti content is over 0.0030%. Thus, the Ti content is 0.0030% or less. It requires considerable cost to lower the Ti content to less than 0.0001%. Therefore, it is not necessary to lower the Ti content to less than 0.0001%.

(Cu: 0.0500% or Less)

Cu is not an essential element, and is contained as an impurity in the steel, for example. There is a possibility that Cu forms fine sulfides so as to deteriorate the magnetic properties. Accordingly, the lower a Cu content is, the better. The formation of Cu sulfides is remarkable when the Cu content is over 0.0500%. Thus, the Cu content is 0.0500% or less. It requires considerable cost to lower the Cu content to less than 0.0001%. Therefore, it is not necessary to lower the Cu content to less than 0.0001%.

(Cr: 0.0500% or Less)

Cr is not an essential element, and is contained as an impurity in the steel, for example. There is a possibility that Cr forms carbides so as to deteriorate the magnetic properties. Accordingly, the lower a Cr content is, the better. The formation of Cr carbides is remarkable when the Cr content is over 0.0500%. Thus, the Cr content is 0.0500% or less. It requires considerable cost to lower the Cr content to less than 0.0001%. Therefore, it is not necessary to lower the Cr content to less than 0.0001%.

(Mo: 0.0500% or Less)

Mo is not an essential element, and is contained as an impurity in the steel, for example. There is a possibility that Mo forms carbides so as to deteriorate the magnetic properties. Accordingly, the lower an Mo content is, the better. The formation of Mo carbides is remarkable when the Mo content is over 0.0500%. Thus, the Mo content is 0.0500% or less. It requires considerable cost to lower the Mo content to less than 0.0001%. Therefore, it is not necessary to lower the Mo content to less than 0.0001%.

(Bi: 0.0050% or Less)

Bi is not an essential element, and is contained as an impurity in the steel, for example. There is a possibility that Bi facilitates formation of fine Mn sulfides so as to deteriorate the magnetic properties. Accordingly, the lower a Bi content is, the better. The facilitation of the fine Mn sulfides is remarkable when the Bi content is over 0.0050%. Thus, the Bi content is 0.0050% or less. It requires considerable cost to lower the Bi content to less than 0.0001%. Therefore, it is not necessary to lower the Bi content to less than 0.0001%.

(Pb: 0.0050% or Less)

Pb is not an essential element, and is contained as an impurity in the steel, for example. There is a possibility that Pb facilitates formation of fine Mn sulfides so as to deteriorate the magnetic properties. Accordingly, the lower a Pb content is, the better. The facilitation of the fine Mn sulfides is remarkable when the Pb content is over 0.0050%. Thus, the Pb content is 0.0050% or less. It requires considerable cost to lower the Pb content to less than 0.0001%. Therefore, it is not necessary to lower the Pb content to less than 0.0001%.

(V: 0.0050% or Less)

V is not an essential element, and is contained as an impurity in the steel, for example. There is a possibility that V forms carbides or nitrides so as to deteriorate the magnetic properties. Accordingly, the lower a V content is, the better. The formation of the V carbides or the V nitrides is remarkable when the V content is over 0.0050%. Thus, the V content is 0.0050% or less. It requires considerable cost to lower the V content to less than 0.0001%. Therefore, it is not necessary to lower the V content to less than 0.0001%.

(B: 0.0050% or Less)

B is not an essential element, and is contained as an impurity in the steel, for example. There is a possibility that B forms nitrides or precipitates containing Fe so as to deteriorate the magnetic properties. Accordingly, the lower a B content is, the better. The formation of the nitrides or the precipitates is remarkable when the B content is over 0.0050%. Thus, the B content is 0.0050% or less. It requires considerable cost to lower the B content to less than 0.0001%. Therefore, it is not necessary to lower the B content to less than 0.0001%.

Next, a thickness of the non-oriented magnetic steel sheet according to the embodiment of the present invention is described. The thickness of the non-oriented magnetic steel sheet according to the embodiment is 0.15 mm or more and 0.30 mm or less. When the thickness is over 0.30 mm, excellent high-frequency core loss cannot be obtained. Thus, the thickness is 0.30 mm or less. When the thickness is less than 0.15 mm, sheet passing through an annealing line in the finish annealing is difficult. Thus, the thickness is 0.15 mm or more.

Next, the magnetic properties of the non-oriented magnetic steel sheet according to the embodiment of the present invention are described. The non-oriented magnetic steel sheet according to the embodiment includes magnetic properties represented by, where the thickness is represented by t (mm), a magnetic flux density B50: "0.2×t+1.52" T or more; a magnetic flux density difference ΔB50: 0.08 T or less; core loss W10/50: 0.95 W/kg or less and core loss W10/400: "20×t+7.5" W/kg or less.

(Magnetic Flux Density B50: "0.2×t+1.52" T or More)

The magnetic flux density B50 is a magnetic flux density at a magnetic field of 5000 A/m. An average value between a magnetic flux density B50 in a rolling direction (hereinafter, it is sometimes called an "L direction") and a magnetic flux density B50 in a direction perpendicular to the rolling direction and a sheet thickness direction (hereinafter, it is sometimes called a "C direction") is used as the magnetic flux density B50 of a non-oriented magnetic steel sheet. When the magnetic flux density B50 is less than "0.2×t+1.52" T, a motor manufactured by using this non-oriented magnetic steel sheet cannot secure sufficient motor torque. Automobiles mounting such motor, for example, a hybrid vehicle and an electric vehicle, have disadvantages at starting. Thus, the magnetic flux density B50 is "0.2×t+1.52" T or more. The larger the magnetic flux density B50 is, the more preferable.

(Magnetic Flux Density Difference ΔB50: 0.08 T or Less)

When the difference ΔB50 of the magnetic flux densities B50 in the L direction and the C direction is over 0.08 T, anisotropy is excessive, and excellent properties cannot be obtained in an integral type motor core. Thus, the magnetic flux density difference ΔB50 is 0.08 T or less.

(Core Loss W10/50: 0.95 W/Kg or Less)

The core loss W10/50 is core loss at a magnetic flux density of 1.0 T and a frequency of 50 Hz. An average value between a core loss W10/50 in the L direction and a core loss W10/50 in the C direction is used as the core loss W10/50 of a non-oriented magnetic steel sheet. When the core loss W10/50 is over 0.95 W/kg, energy loss of a motor core manufactured by using this non-oriented magnetic steel sheet becomes excessively large, and a heating value and a power generator size increase. Thus, the core loss W10/50 is 0.95 W/kg or less. The smaller the core loss W10/50 is, the more preferable.

(Core Loss W10/400: "20×t+7.5" W/Kg or Less)

The core loss W10/400 is core loss at the magnetic flux density of 1.0 T and a frequency of 400 Hz. An average value between a core loss W10/400 in the L direction and a core loss W10/400 in the C direction is used as the core loss W10/400 of a non-oriented magnetic steel sheet. When the core loss W10/400 is over "20×t+7.5" W/kg, energy loss of a motor core manufactured by using this non-oriented magnetic steel sheet becomes excessively large, and a heating value and a power generator size increase. Thus, the core loss W10/400 is "20×t+7.5" W/kg or less. The smaller the core loss W10/400 is, the more preferable.

The magnetic flux density B50, the core loss W10/50, and the core loss W10/400 may be measured by an Epstein tester defined in JIS C 2550 or a single sheet tester (SST) defined in JIS C 2556, for example.

Next, carbides contained in the non-oriented magnetic steel sheet according to the embodiment of the present invention are described. In the non-oriented magnetic steel sheet according to the embodiment, a ratio of a number of intergranular carbides precipitated in grains relative to a sum of the number of the intergranular carbides and a number of grain boundary carbides precipitated on grain boundaries is 0.50 or less. When the ratio is over 0.50, the intergranular carbides are excessive, and the core loss increases. Thus, the ratio is 0.50 or less. The number of intergranular carbides and the number of grain boundary carbides may be specified by a scanning microscopic observation.

Next, a method of manufacturing the non-oriented magnetic steel sheet according to the embodiment is described. In the manufacturing method, hot-rolling, hot-rolled sheet annealing, cold-rolling, finish annealing, and so on are performed.

In the hot-rolling, heating of a steel material such as a slab having the above-stated chemical composition (slab heating) is performed, then rough rolling and finish rolling are performed, for example. A temperature of the slab heating is preferably 1000° C. or more and 1250° C. or less. A thickness of a hot-rolled steel sheet obtained by the hot-rolling is preferably 1.6 mm or more and 2.6 mm or less. After the hot-rolling, annealing of the hot-rolled steel sheet (hot-rolled sheet annealing) is performed. After the hot-rolled sheet annealing, the cold-rolling of the hot-rolled steel sheet is performed to obtain a cold-rolled steel sheet. The cold-rolling may be performed once, or twice or more being intervened by intermediate annealing.

The hot-rolled steel sheet is retained in a first temperature range from 850° C. to 1100° C. for 10 seconds to 120 seconds, and thereafter, cooled at a rate of 5° C./s to 50° C./s in a temperature zone from 850° C. to 600° C., in the intermediate annealing if the intermediate annealing is performed, or in the hot-rolled sheet annealing if the intermediate annealing is not performed. If the intermediate annealing is not performed, the hot-rolled sheet annealing is an example of first annealing, and if the intermediate annealing is performed, the intermediate annealing is an example of the first annealing. When the retaining temperature (first retention temperature) is less than 850° C., crystal grains are not sufficiently coarsened, and the sufficient magnetic flux density B50 cannot be obtained. Thus, the first retention temperature is 850° C. or more, and preferably 950° C. or more. When the first retention temperature is over 1100° C., the toughness is lowered, and fractures occur easily in the subsequent cold-rolling. Thus, the first retention temperature is 1100° C. or less. When the retaining time (first retention time) is less than 10 seconds, the crystal grains are not sufficiently coarsened, and the sufficient magnetic flux density B50 cannot be obtained. Thus, the first retention time is 10 seconds or more. When the first retention time is over 120 seconds, the toughness is lowered, and the fractures occur easily in the subsequent cold-rolling. Thus, the first retention time is 120 seconds or less. When the cooling rate (first cooling rate) after the retention is less than 5° C./s, the sufficient magnetic flux density B50 cannot be obtained, and the core loss W10/50 and the core loss W10/400 increase. Thus, the first cooling rate is 5° C./s or more, and preferably 20° C./s or more. When the first cooling rate is over 50° C./s, the steel sheet largely deforms, and the fractures occur easily in the subsequent cold-rolling. Thus, the first cooling rate is 50° C./s or less.

After the cold-rolling, the finish annealing of the cold-rolled steel sheet is performed. The finish annealing is an example of second annealing. In the finish annealing, the cold-rolled steel sheet is retained in a second temperature range from 900° C. to 1100° C. for 10 seconds to 240 seconds, and thereafter, cooled at a rate of 10° C./s to 40° C./s in a temperature zone from 900° C. to 300° C. When the retaining temperature (second retention temperature) is less than 900° C., the crystal grains are not sufficiently coarsened, and the excellent magnetic properties cannot be obtained. Thus, the second retention temperature is 900° C. or more, and preferably 950° C. or more. When the second retention temperature is over 1100° C., the crystal grains are excessively coarsened, and the high-frequency core loss increases. Thus, the second retention temperature is 1100° C. or less, and preferably 1050° C. or less. When the retaining time (second retention time) is less than 10 seconds, the crystal grains are not sufficiently coarsened, and the excellent magnetic properties cannot be obtained. Thus, the second retention time is 10 seconds or more, and preferably 15 seconds or more. When the second retention time is over 240 seconds, the crystal grains are excessively coarsened, and the high-frequency core loss increases. Thus, the second retention time is 240 seconds or less, and preferably 200 seconds or less. When the cooling rate (second cooling rate) after the retention is over 40° C./s, the ratio of the number of intergranular carbides relative to the total number of intergranular carbides and grain boundary carbides becomes over 0.50, and the core loss increases. Thus, the second cooling rate is 40° C./s or less, and preferably 30° C./s or less. When the second cooling rate is less than 10° C./s, an effect of lowering the core loss is saturated, and productivity is lowered. Thus, the second cooling rate is 10° C./s or less.

The non-oriented magnetic steel sheet according to the embodiment may be thereby manufactured. After the finish annealing, an insulating coating film may be formed by coating and baking.

The non-oriented magnetic steel sheet according to the embodiment as stated above is used for, for example, an iron core of a motor, and it is possible to largely contribute to reduction in energy consumption of an air-conditioner, a refrigerator, an electric vehicle, a hybrid vehicle, and so on.

Hereinabove, preferred embodiments of the present invention are described in detail, but the present invention is not limited to these examples. It is apparent to a person skilled in the art to which the present invention belongs that various modification examples or revised examples can be devised within the scope of technical ideas described in claims, and it is understood that these also fall into the technical scope of the present invention as a matter of course.

EXAMPLES

Next, the non-oriented magnetic steel sheet according to the embodiment of the present invention is concretely described while illustrating examples. The examples illustrated in the following are only examples of the non-oriented magnetic steel sheet according to the embodiment of the present invention, and the non-oriented magnetic steel sheet according to the present invention is not limited to the following examples.

First Experiment

In a first experiment, a steel ingot containing: in mass %, C: 0.0022%, S: 0.0012%, Ti: 0.0015%, N: 0.0018%, Sn: 0.022%, P: 0.016%, Ni: 0.031%, Cu: 0.024%, and the balance of Si, Al, Mn, Fe and impurities was manufactured by using a vacuum melting furnace. Contents of Si, Al, and Mn in each steel ingot are listed in Table 1.

Then, the steel ingot was heated at 1150° C. for one hour in a heating furnace, taken out of the heating furnace, then six passes of hot-rolling in total were performed to obtain a hot-rolled steel sheet with a thickness of 2.0 mm. Thereafter, the hot-rolled steel sheet was retained at 1000° C. for 60 seconds in hot-rolled sheet annealing. The cooling rate in cooling after the retention from 850° C. to 600° C. was 25° C./s. Subsequently, cold-rolling of the hot-rolled steel sheet was performed to obtain a cold-rolled steel sheet with a thickness of 0.30 mm. Then, the cold-rolled steel sheet was retained at 1000° C. for 20 seconds in finish annealing. The cooling rate in cooling after the retention from 900° C. to 300° C. was 15° C./s. Thereafter, an insulating coating film was formed by coating and baking. A non-oriented magnetic steel sheet was thereby manufactured.

Six pieces of 55 mm square samples were made of each non-oriented magnetic steel sheet, then the core losses W10/400, the core losses W10/50, and the magnetic flux densities B50 in the L direction and the C direction of each sample were measured by the SST method. An average value between the core loss W10/400 in the L direction and the core loss W10/400 in the C direction, an average value between the core loss W10/50 in the L direction and the core loss W10/50 in the C direction, an average value between the magnetic flux density B50 in the L direction and the magnetic flux density B50 in the C direction, and a difference ΔB50 between the magnetic flux density B50 in the L direction and the magnetic flux density B50 in the C direction were calculated by each sample. An average value among the core losses W10/400 of the six pieces of samples, an average value among the core losses W10/50 of the six pieces of samples, and an average value among the magnetic flux densities B50 of the six pieces of samples were calculated by each of the non-oriented magnetic steel sheets by using the above-stated average values. An average value among the magnetic flux densities B50 in the L direction of the six pieces of samples, an average value among the magnetic flux densities B50 in the C direction of the six pieces of samples, and an average value among the magnetic flux density differences ΔB50 of the six pieces of samples were calculated by each of the non-oriented magnetic steel sheets. These results are also listed in Table 1. Underlines in Table 1 indicate that the numerical values are out of the range of the present invention.

Scanning microscopic observation was performed within a visual field with an area of 0.25 mm² by each non-oriented magnetic steel sheet, and it was found that a ratio of a number of intergranular carbides precipitated in grains relative to a sum of the number of the intergranular carbides and a number of grain boundary carbides precipitated on grain boundaries was 0.50 or less in any non-oriented magnetic steel sheet.

TABLE 1

| SAMPLE No. | Si (mass %) | Al (mass %) | Mn (mass %) | W10/400 (W/kg) | W10/50 (W/kg) | B50 (T) | Δ B50 (T) | REMARKS |
|---|---|---|---|---|---|---|---|---|
| 1-1 | 2.8 | 0.80 | 0.7 | 14.2 | 0.98 | 1.67 | 0.08 | COMPARATIVE EXAMPLE |
| 1-2 | 3.0 | 0.80 | 0.7 | 13.5 | 0.94 | 1.66 | 0.07 | EXAMPLE |
| 1-3 | 3.2 | 0.40 | 0.7 | 14.1 | 0.97 | 1.67 | 0.08 | COMPARATIVE EXAMPLE |
| 1-4 | 3.2 | 0.60 | 0.7 | 13.5 | 0.93 | 1.66 | 0.06 | EXAMPLE |

TABLE 1-continued

| SAMPLE No. | Si (mass %) | Al (mass %) | Mn (mass %) | W10/400 (W/kg) | W10/50 (W/kg) | B50 (T) | Δ B50 (T) | REMARKS |
|---|---|---|---|---|---|---|---|---|
| 1-5 | 3.2 | 0.80 | <u>0.3</u> | <u>14.5</u> | <u>0.96</u> | 1.66 | 0.07 | COMPARATIVE EXAMPLE |
| 1-6 | 3.2 | 0.80 | 0.5 | 13.4 | 0.94 | 1.66 | 0.06 | EXAMPLE |
| 1-7 | 3.2 | 0.80 | 0.7 | 13.0 | 0.90 | 1.65 | 0.06 | EXAMPLE |
| 1-8 | 3.2 | 0.80 | 1.0 | 12.9 | 0.85 | 1.65 | 0.06 | EXAMPLE |
| 1-9 | 3.2 | 0.80 | 1.5 | 12.8 | 0.82 | 1.64 | 0.06 | EXAMPLE |
| 1-10 | 3.2 | 0.80 | <u>1.7</u> | <u>14.1</u> | 1.02 | 1.64 | 0.07 | COMPARATIVE EXAMPLE |
| 1-11 | 3.2 | 0.90 | 0.7 | 13.0 | 0.90 | 1.65 | 0.06 | EXAMPLE |
| 1-12 | 3.2 | 1.10 | 0.7 | 12.9 | 0.98 | 1.64 | 0.08 | EXAMPLE |
| 1-13 | 3.2 | <u>1.30</u> | 0.7 | 12.8 | <u>1.02</u> | 1.63 | <u>0.09</u> | COMPARATIVE EXAMPLE |
| 1-14 | 3.4 | 0.80 | 0.7 | 12.9 | 0.87 | 1.65 | 0.06 | EXAMPLE |
| 1-15 | 3.6 | 0.80 | 0.7 | 12.8 | 0.84 | 1.64 | 0.06 | EXAMPLE |
| 1-16 | <u>3.7</u> | 0.80 | 0.7 | UNMEASURABLE | | | | COMPARATIVE EXAMPLE |

As listed in Table 1, in each of samples No. 1-2, No. 1-4, No. 1-6 to No. 1-9, No. 1-11, No. 1-12, No. 1-14 and No. 1-15, the chemical composition was within the range of the present invention, and excellent magnetic properties could be obtained. In each of the samples No. 1-7 to No. 1-9, No. 1-11, No. 1-14 and No. 1-15, the Si content and the Mn content were within the preferable range, and particularly excellent magnetic properties could be obtained.

In a sample No. 1-1, the Si content was less than the lower limit of the range of the present invention, and therefore, the core loss was high. In a sample No. 1-3, the Al content was less than the lower limit of the range of the present invention, and therefore, the core loss was high. In a sample No. 1-5, the Mn content was less than the lower limit of the range of the present invention, and therefore, the core loss was high. In a sample No. 1-10, the Mn content was over the upper limit of the range of the present invention, and therefore, the core loss was high. In a sample No. 1-13, the Al content was over the upper limit of the range of the present invention, and therefore, the core loss at the commercial frequency was high, and the magnetic flux density difference was large. In a sample No. 1-16, the Si content was over the upper limit of the range of the present invention, and therefore, fractures occurred during the cold-rolling, and the magnetic properties could not be measured.

Second Experiment

In a second experiment, a steel ingot containing: in mass %, Si: 3.2%, Al: 0.80%, Mn: 0.9%, C: 0.0029%, S: 0.0019%, Ti: 0.0012%, N: 0.0024%, Sb: 0.010%, Sn: 0.042%, P: 0.025%, Ni: 0.024%, Cr: 0.02%, and the balance of Fe and impurities was manufactured by using a vacuum melting furnace.

Then, the steel ingot was heated at 1100° C. for one hour in a heating furnace, taken out of the heating furnace, then six passes of hot-rolling in total were performed to obtain a hot-rolled steel sheet with a thickness of 2.0 mm. Thereafter, the hot-rolled sheet annealing was performed. A first retention temperature T1, a first retention time t1, and a first cooling rate R1 in the hot-rolled sheet annealing were listed in Table 2. Subsequently, cold-rolling of the hot-rolled steel sheet was performed to obtain a cold-rolled steel sheet with a thickness of 0.25 mm. Then, the cold-rolled steel sheet was retained at 980° C. for 25 seconds in finish annealing. The cooling rate in cooling after the retention from 900° C. to 300° C. was 20° C./s. Thereafter, an insulating coating film was formed by coating and baking. A non-oriented magnetic steel sheet was thereby manufactured.

Measurements of the magnetic properties were performed similarly to the first experiment. These results are also listed in Table 2. Underlines in Table 2 indicate that the numerical values are out of the range of the present invention. It was found that a ratio of a number of intergranular carbides precipitated in grains relative to a sum of the number of the intergranular carbides and a number of grain boundary carbides precipitated on grain boundaries was 0.50 or less in any non-oriented magnetic steel sheet similarly to the first experiment.

TABLE 2

| SAMPLE No. | T1 (° C.) | t1 (s) | R1 (° C./s) | W10/400 (W/kg) | W10/50 (W/kg) | B50 (T) | Δ B50 (T) | REMARKS |
|---|---|---|---|---|---|---|---|---|
| 2-1 | <u>820</u> | 60 | 20 | <u>13.1</u> | <u>1.03</u> | <u>1.54</u> | 0.04 | COMPARATIVE EXAMPLE |
| 2-2 | 860 | <u>8</u> | 20 | <u>12.6</u> | <u>1.00</u> | <u>1.55</u> | 0.04 | COMPARATIVE EXAMPLE |
| 2-3 | 860 | 15 | 20 | 12.3 | 0.94 | 1.57 | 0.04 | EXAMPLE |
| 2-4 | 950 | 60 | <u>4</u> | <u>12.6</u> | <u>0.97</u> | <u>1.56</u> | 0.04 | COMPARATIVE EXAMPLE |
| 2-5 | 950 | 60 | 8 | 12.1 | 0.93 | 1.58 | 0.05 | EXAMPLE |
| 2-6 | 950 | 60 | 15 | 12.0 | 0.92 | 1.59 | 0.05 | EXAMPLE |
| 2-7 | 950 | 60 | 24 | 11.9 | 0.89 | 1.60 | 0.05 | EXAMPLE |
| 2-8 | 950 | 60 | 38 | 11.7 | 0.87 | 1.61 | 0.05 | EXAMPLE |
| 2-9 | 950 | 60 | 46 | 11.6 | 0.87 | 1.61 | 0.06 | EXAMPLE |
| 2-10 | 950 | 60 | <u>54</u> | UNMEASURABLE | | | | COMPARATIVE EXAMPLE |
| 2-11 | 1050 | 60 | 20 | 11.5 | 0.85 | 1.62 | 0.07 | EXAMPLE |
| 2-12 | 1050 | <u>130</u> | 20 | UNMEASURABLE | | | | COMPARATIVE EXAMPLE |
| 2-13 | <u>1120</u> | 60 | 20 | UNMEASURABLE | | | | COMPARATIVE EXAMPLE |

As listed in Table 2, in each of samples No. 2-3, No. 2-5 to No. 2-9 and No. 2-11, the conditions of the first annealing were within the range of the present invention, and the excellent magnetic properties were obtained. In each of the samples No. 2-7 to No. 2-9 and No. 2-11, the first retention temperature and the first cooling rate were each within the preferable range, and particularly excellent magnetic properties could be obtained.

In a sample No. 2-1, the first retention temperature T1 was less than the lower limit of the range of the present invention, and therefore, the core loss was high, and the magnetic flux density was low. In a sample No. 2-2, the first retention time t1 was less than the lower limit of the range of the present invention, and therefore, the core loss was high, and the magnetic flux density was low. In a sample No. 2-4, the first cooling rate R1 was less than the lower limit of the range of the present invention, and therefore, the core loss was high, and the magnetic flux density was low. In a sample No. 2-10, the first cooling rate R1 was over the upper limit of the range of the present invention, and therefore, the steel sheet largely deformed, fractures occurred during the cold-rolling, and the magnetic properties could not be measured. In a sample No. 2-12, the first retention time t1 was over the upper limit of the range of the present invention, and therefore, the toughness was lowered, the fractures occurred during the cold-rolling, and the magnetic properties could not be measured. In a sample No. 2-13, the first retention temperature T1 was over the upper limit of the range of the present invention, and therefore, the toughness was lowered, the fractures occurred during the cold-rolling, and the magnetic properties could not be measured.

Third Experiment

In a third experiment, a steel ingot containing: in mass %, Si: 3.4%, Al: 0.80%, Mn: 0.9%, C: 0.0010%, S: 0.0014%, Ti: 0.0018%, N: 0.0022%, Sb: 0.022%, Sn: 0.051%, P: 0.018%, Ni: 0.034%, Cr: 0.03%, Cu: 0.04%, Mo: 0.01%, B: 0.0009%, and the balance of Fe and impurities was manufactured by using a vacuum melting furnace.

Then, the steel ingot was heated at 1170° C. for one hour in a heating furnace, taken out of the heating furnace, then six passes of hot-rolling in total were performed to obtain a hot-rolled steel sheet with a thickness of 2.1 mm. Thereafter, the hot-rolled steel sheet was retained at 980° C. for 50 seconds in hot-rolled sheet annealing. The cooling rate in cooling after the retention from 850° C. to 600° C. was 29° C./s. Subsequently, cold-rolling of the hot-rolled steel sheet was performed to obtain a cold-rolled steel sheet with a thickness of 0.25 mm. Then, finish annealing was performed. A second retention temperature T2, a second retention time t2 and a second cooling rate R2 in the finish annealing are listed in Table 3. Thereafter, an insulating coating film was formed by coating and baking. A non-oriented magnetic steel sheet was thereby manufactured.

Measurements of the magnetic properties were performed, and a ratio of a number of intergranular carbides precipitated in grains relative to a sum of the number of the intergranular carbides and a number of grain boundary carbides precipitated on grain boundaries was measured, similarly to the first experiment. These results are also listed in Table 3. Underlines in Table 3 indicate that the numerical values are out of the range of the present invention.

TABLE 3

| SAMPLE No. | T2 (° C.) | t2 (s) | R2 (° C./s) | W10/400 (W/kg) | W10/50 (W/kg) | B50 (T) | Δ B50 (T) | RATIO OF INTERGRANULAR CARBIDES | REMARKS |
|---|---|---|---|---|---|---|---|---|---|
| 3-1 | 850 | 240 | 30 | 13.4 | 1.03 | 1.66 | 0.07 | 0.30 | COMPARATIVE EXAMPLE |
| 3-2 | 900 | 120 | 30 | 12.1 | 0.92 | 1.66 | 0.06 | 0.30 | EXAMPLE |
| 3-3 | 950 | 7 | 30 | 12.9 | 0.97 | 1.66 | 0.06 | 0.30 | COMPARATIVE EXAMPLE |
| 3-4 | 950 | 12 | 30 | 12.4 | 0.95 | 1.66 | 0.06 | 0.30 | EXAMPLE |
| 3-5 | 950 | 60 | 30 | 11.9 | 0.89 | 1.65 | 0.06 | 0.30 | EXAMPLE |
| 3-6 | 950 | 120 | 30 | 11.6 | 0.86 | 1.65 | 0.05 | 0.30 | EXAMPLE |
| 3-7 | 950 | 200 | 30 | 11.9 | 0.86 | 1.65 | 0.05 | 0.30 | EXAMPLE |
| 3-8 | 950 | 280 | 30 | 12.6 | 0.87 | 1.64 | 0.05 | 0.30 | COMPARATIVE EXAMPLE |
| 3-9 | 950 | 60 | 45 | 13.2 | 1.01 | 1.62 | 0.06 | 0.58 | COMPARATIVE EXAMPLE |
| 3-10 | 950 | 60 | 38 | 12.2 | 0.92 | 1.65 | 0.06 | 0.38 | EXAMPLE |
| 3-11 | 950 | 60 | 22 | 11.8 | 0.89 | 1.65 | 0.06 | 0.27 | EXAMPLE |
| 3-12 | 950 | 60 | 15 | 11.7 | 0.88 | 1.65 | 0.06 | 0.26 | EXAMPLE |
| 3-13 | 950 | 60 | 10 | 11.7 | 0.87 | 1.65 | 0.06 | 0.25 | EXAMPLE |
| 3-14 | 1000 | 15 | 32 | 11.6 | 0.87 | 1.65 | 0.04 | 0.33 | EXAMPLE |
| 3-15 | 1050 | 15 | 32 | 11.7 | 0.87 | 1.65 | 0.04 | 0.33 | EXAMPLE |
| 3-16 | 1080 | 15 | 32 | 12.5 | 0.89 | 1.64 | 0.04 | 0.33 | EXAMPLE |
| 3-17 | 1120 | 15 | 32 | 12.9 | 0.92 | 1.62 | 0.04 | 0.33 | COMPARATIVE EXAMPLE |

As listed in Table 3, in each of samples No. 3-2, No. 3-4 to No. 3-7 and No. 3-10 to No. 3-16, the conditions of the second annealing were within the range of the present invention, and the excellent magnetic properties were obtained. In each of the samples No. 3-5 to No. 3-7 and No. 3-11 to No. 3-13, the second retention temperature, the second retention time, and the second cooling rate were within the preferable range, and particularly excellent magnetic properties were obtained.

In a sample No. 3-1, the second retention temperature T2 was less than the lower limit of the range of the present invention, and therefore, the core loss was high. In a sample No. 3-3, the second retention time t2 was less than the lower limit of the range of the present invention, and therefore, the core loss was high. In a sample No. 3-8, the second retention time t2 was over the upper limit of the range of the present invention, and therefore, the high-frequency core loss was high. In a sample No. 3-9, the second cooling rate R2 was over the upper limit of the range of the present invention, and therefore, the ratio of the intergranular carbides was high, and the core loss was high. In a sample No. 3-17, the second retention temperature T2 was over the upper limit of the range of the present invention, and therefore, the high-frequency core loss was high.

Fourth Experiment

In a fourth experiment, a steel ingot containing: in mass %, Si: 3.2%, Al: 0.80%, Mn: 1.0%, S: 0.0010%, Ti:

0.0012%, N: 0.0020%, Sn: 0.041%, Cu: 0.022%, and the balance of P, Ni, C, Fe and impurities was manufactured by using a vacuum melting furnace. Contents of P, Ni, and C in each steel ingot are listed in Table 4.

Then, the steel ingot was heated at 1140° C. for one hour in a heating furnace, taken out of the heating furnace, then six passes of hot-rolling in total were performed to obtain a hot-rolled steel sheet with a thickness of 2.0 mm. Thereafter, the hot-rolled steel sheet was retained at 880° C. for 40 seconds in hot-rolled sheet annealing. The cooling rate in cooling after the retention from 850° C. to 600° C. was 29° C./s. Subsequently, cold-rolling of the hot-rolled steel sheet was performed to obtain a cold-rolled steel sheet with a thickness of 0.30 mm. Then, the cold-rolled steel sheet was retained at 1000° C. for 12 seconds in finish annealing. The cooling rate in cooling after the retention from 900° C. to 300° C. was 25° C./s. Thereafter, an insulating coating film was formed by coating and baking. A non-oriented magnetic steel sheet was thereby manufactured.

Measurements of the magnetic properties were performed similarly to the first experiment. These results are also listed in Table 4. Underlines in Table 4 indicate that the numerical values are out of the range of the present invention. It was found that a ratio of a number of intergranular carbides precipitated in grains relative to a sum of the number of the intergranular carbides and a number of grain boundary carbides precipitated on grain boundaries was 0.50 or less in any non-oriented magnetic steel sheet similarly to the first experiment.

the present invention, and therefore, the magnetic flux density was low. In each of samples No. 4-10 and No. 4-11, the P content, the Ni content and the C content were each over the upper limit of the range of the present invention, and therefore, the core loss was high.

Fifth Experiment

In a fifth experiment, a steel ingot containing: in mass %, Si: 3.3%, Al: 0.80%, Mn: 1.1%, C: 0.0012%, S: 0.0018%, Ti: 0.0015%, N: 0.0024%, Sb: 0.004%, Sn: 0.058%, P: 0.015%, Ni: 0.018%, Cr: 0.005%, Cu: 0.010%, and the balance of Fe and impurities was manufactured by using a vacuum melting furnace.

Then, the steel ingot was heated at 1160° C. for one hour in a heating furnace, taken out of the heating furnace, then six passes of hot-rolling in total were performed to obtain a hot-rolled steel sheet with a thickness of 2.0 mm. Thereafter, the hot-rolled steel sheet was retained at 1000° C. for 60 seconds in hot-rolled sheet annealing. The cooling rate in cooling after the retention from 850° C. to 600° C. was 28° C./s. Subsequently, cold-rolling of the hot-rolled steel sheet was performed to obtain a cold-rolled steel sheet with a thickness of 0.15 mm. Then, finish annealing was performed. A second retention temperature T2, a second retention time t2 and a second cooling rate R2 in the finish annealing are listed in Table 5. Thereafter, an insulating coating film was formed by coating and baking. A non-oriented magnetic steel sheet was thereby manufactured.

TABLE 4

| SAMPLE No. | P (mass %) | Ni (mass %) | C (mass %) | W10/400 (W/kg) | W10/50 (W/kg) | B50 (T) | Δ B50 (T) | REMARKS |
|---|---|---|---|---|---|---|---|---|
| 4-1 | 0.008 | 0.007 | 0.0006 | 13.1 | 0.91 | 1.57 | 0.05 | COMPARATIVE EXAMPLE |
| 4-2 | 0.012 | 0.016 | 0.0018 | 13.0 | 0.90 | 1.60 | 0.05 | EXAMPLE |
| 4-3 | 0.018 | 0.017 | 0.0019 | 13.0 | 0.90 | 1.60 | 0.05 | EXAMPLE |
| 4-4 | 0.011 | 0.024 | 0.0016 | 13.0 | 0.90 | 1.60 | 0.05 | EXAMPLE |
| 4-5 | 0.013 | 0.016 | 0.0022 | 13.0 | 0.90 | 1.60 | 0.05 | EXAMPLE |
| 4-6 | 0.019 | 0.026 | 0.0021 | 13.0 | 0.90 | 1.62 | 0.05 | EXAMPLE |
| 4-7 | 0.041 | 0.051 | 0.0025 | 13.1 | 0.91 | 1.63 | 0.05 | EXAMPLE |
| 4-8 | 0.093 | 0.091 | 0.0029 | 13.2 | 0.93 | 1.63 | 0.05 | EXAMPLE |
| 4-9 | 0.132 | 0.165 | 0.0037 | 13.4 | 0.94 | 1.63 | 0.05 | EXAMPLE |
| 4-10 | 0.166 | 0.223 | 0.0043 | 13.7 | 0.98 | 1.63 | 0.06 | COMPARATIVE EXAMPLE |
| 4-11 | 0.193 | 0.259 | 0.0058 | 14.2 | 1.05 | 1.63 | 0.06 | COMPARATIVE EXAMPLE |

As illustrated in Table 4, in each of samples No. 4-2 to No. 4-9, the chemical composition was within the range of the present invention, and the excellent magnetic properties could be obtained. In each of samples No. 4-6 to No. 4-8, the P content, the Ni content and the C content were within the preferable range, and particularly excellent magnetic properties could be obtained.

In a sample No. 4-1, the P content, the Ni content and the C content were each less than the lower limit of the range of Measurements of the magnetic properties were performed similarly to the first experiment. These results are also listed in Table 5. Underlines in Table 5 indicate that the numerical values are out of the range of the present invention. It was found that a ratio of a number of intergranular carbides precipitated in grains relative to a sum of the number of the intergranular carbides and a number of grain boundary carbides precipitated on grain boundaries was 0.50 or less in any non-oriented magnetic steel sheet similarly to the first experiment.

TABLE 5

| SAMPLE No. | T2 (° C.) | t2 (s) | R2 (° C./s) | W10/400 (W/kg) | W10/50 (W/kg) | B50 (T) | Δ B50 (T) | REMARKS |
|---|---|---|---|---|---|---|---|---|
| 5-1 | 830 | 120 | 28 | 11.4 | 1.04 | 1.53 | 0.03 | COMPARATIVE EXAMPLE |
| 5-2 | 900 | 120 | 28 | 10.4 | 0.93 | 1.60 | 0.03 | EXAMPLE |
| 5-3 | 950 | 7 | 28 | 10.9 | 0.97 | 1.60 | 0.04 | COMPARATIVE EXAMPLE |
| 5-4 | 950 | 15 | 28 | 9.9 | 0.89 | 1.61 | 0.04 | EXAMPLE |
| 5-5 | 950 | 60 | 28 | 9.7 | 0.88 | 1.61 | 0.04 | EXAMPLE |
| 5-6 | 950 | 120 | 28 | 9.6 | 0.87 | 1.62 | 0.04 | EXAMPLE |
| 5-7 | 950 | 200 | 28 | 9.6 | 0.86 | 1.62 | 0.04 | EXAMPLE |
| 5-8 | 950 | 280 | 28 | 10.7 | 0.92 | 1.60 | 0.04 | COMPARATIVE EXAMPLE |

TABLE 5-continued

| SAMPLE No. | T2 (° C.) | t2 (s) | R2 (° C./s) | W10/400 (W/kg) | W10/50 (W/kg) | B50 (T) | Δ B50 (T) | REMARKS |
|---|---|---|---|---|---|---|---|---|
| 5-9 | 1000 | 15 | 28 | 9.5 | 0.85 | 1.61 | 0.05 | EXAMPLE |
| 5-10 | 1050 | 15 | 28 | 9.7 | 0.87 | 1.62 | 0.05 | EXAMPLE |
| 5-11 | 1080 | 15 | 28 | 10.4 | 0.92 | 1.62 | 0.05 | EXAMPLE |
| 5-12 | 1120 | 15 | 28 | 10.9 | 0.97 | 1.54 | 0.06 | COMPARATIVE EXAMPLE |

As listed in Table 5, in each of samples No. 5-2, No. 5-4 to No. 5-7, and No. 5-9 to No. 5-11, the conditions of the second annealing were within the range of the present invention, and the excellent magnetic properties could be obtained. In each of the samples No. 5-4 to No. 5-7, No. 5-9 and No. 5-10, the second retention temperature, the second retention time, and the second cooling rate were within the preferable range, and particularly excellent magnetic properties could be obtained.

In a sample No. 5-1, the second retention temperature T2 was less than the lower limit of the range of the present invention, and therefore, the core loss was high, and the magnetic flux density was low. In a sample No. 5-3, the second retention time t2 was less than the lower limit of the range of the present invention, and therefore, the core loss was high. In a sample No. 5-8, the second retention time t2 was over the upper limit of the range of the present invention, and therefore, the core loss was low, and the magnetic flux density was high. In a sample No. 5-12, the second retention temperature T2 was over the upper limit of the range of the present invention, and therefore, the core loss was high, and the magnetic flux density was low.

INDUSTRIAL APPLICABILITY

The present invention may be used for, for example, manufacturing industries of a non-oriented magnetic steel sheet and utilizing industries of the non-oriented magnetic steel sheet.

The invention claimed is:

1. A non-oriented magnetic steel sheet, comprising:
a chemical composition represented by, in mass %:
Si: 3.0% to 3.6%;
Al: 0.50% to 1.25%;
Mn: 0.5% to 1.5%;
Sb or Sn or both of them: [Sb]+[Sn]/2 is 0.0025% to 0.05% where [Sb] denotes an Sb content and [Sn] denotes an Sn content;
P: 0.010% to 0.150%;
Ni: 0.010% to 0.200%;
C: 0.0010% to 0.0040%;
N: 0.0030% or less;
S: 0.0020% or less;
Ti: 0.0030% or less;
Cu: 0.0500% or less;
Cr: 0.0500% or less;
Mo: 0.0500% or less;
Bi: 0.0050% or less;
Pb: 0.0050% or less;
V: 0.0050% or less;
B: 0.0050% or less; and
balance: Fe and impurities, and
magnetic properties represented by, where t denotes a thickness (mm) of the non-oriented magnetic steel sheet:
a magnetic flux density B50: "0.2×t+1.52" T or more;
a magnetic flux density difference ΔB50: 0.08 T or less;
core loss W10/50: 0.95 W/kg or less; and
core loss W10/400: "20×t+7.5" W/kg or less,
wherein
the thickness is 0.15 mm to 0.30 mm, and
a ratio of a number of intergranular carbides precipitated in grains relative to a sum of the number of the intergranular carbides and a number of grain boundary carbides precipitated on grain boundaries is 0.50 or less.

2. The non-oriented magnetic steel sheet according to claim 1, wherein in the chemical composition,
P: 0.015% to 0.100%,
Ni: 0.020% to 0.100%, or
C: 0.0020% to 0.0030%, or
any combination thereof is satisfied.

3. A method of manufacturing a non-oriented magnetic steel sheet, comprising:
hot-rolling of a steel material to obtain a hot-rolled steel sheet;
cold-rolling of the hot-rolled steel sheet to obtain a cold-rolled steel sheet;
first annealing of the hot-rolled steel sheet before the cold-rolling is completed; and
second annealing of the cold-rolled steel sheet,
wherein the first annealing includes:
retaining the hot-rolled steel sheet in a first temperature range from 850° C. to 1100° C. for 10 seconds to 120 seconds, and
after the retaining, cooling the hot-rolled steel sheet at a rate of 5° C./s to 50° C./s in a temperature zone from 850° C. to 600° C.,
wherein the second annealing includes:
retaining the cold-rolled steel sheet in a second temperature range from 900° C. to 1100° C. for 10 seconds to 240 seconds, and
after the retaining, cooling the cold-rolled steel sheet at a rate of 10° C./s 15° C./s to 40° C./s in a temperature zone from 900° C. to 300° C., and
wherein the steel material comprises a chemical composition represented by, in mass %,
Si: 3.0% to 3.6%;
Al: 0.50% to 1.25%;
Mn: 0.5% to 1.5%;
Sb or Sn or both of them: [Sb]+[Sn]/2 is 0.0025% to 0.05% where [Sb] denotes an Sb content and [Sn] denotes an Sn content;
P: 0.010% to 0.150%;
Ni: 0.010% to 0.200%;
C: 0.0010% to 0.0040%;
N: 0.0030% or less;
S: 0.0020% or less;
Ti: 0.0030% or less;
Cu: 0.0500% or less;
Cr: 0.0500% or less;
Mo: 0.0500% or less;
Bi: 0.0050% or less;
Pb: 0.0050% or less;

V: 0.0050% or less;
B: 0.0050% or less; and
balance: Fe and impurities.

4. The method of manufacturing the non-oriented magnetic steel sheet according to claim 3, wherein hot-rolled sheet annealing is performed as the first annealing before the cold-rolling.

5. The method of manufacturing the non-oriented magnetic steel sheet according to claim 3, further comprising hot-rolled sheet annealing before the cold-rolling, wherein an intermediate annealing is performed as the first annealing during the cold-rolling.

6. The method of manufacturing the non-oriented magnetic steel sheet according to claim 3, wherein in the chemical composition,
P: 0.015% to 0.100%,
Ni: 0.020% to 0.100%, or
C: 0.0020% to 0.0030%, or
any combination thereof is satisfied.

7. The method of manufacturing the non-oriented magnetic steel sheet according to claim 3, wherein a thickness of the cold-rolled steel sheet is 0.15 mm to 0.30 mm.

* * * * *